United States Patent
Zhang et al.

(10) Patent No.: US 10,558,736 B2
(45) Date of Patent: Feb. 11, 2020

(54) METADATA DRIVEN USER INTERFACE LAYOUT CONTROL FOR WEB APPLICATIONS

(71) Applicant: SAP SE, Walldorf (DE)

(72) Inventors: Liangyi Zhang, Shanghai (CN); Jing Zhao, Shanghai (CN); Jianzhong Li, Shanghai (CN); Yonggao Pan, Shanghai (CN); Shangtong Zhang, Shanghai (CN); Ke Lu, Shanghai (CN)

(73) Assignee: SAP SE, Walldorf (DE)

( * ) Notice: Subject to any disclaimer, the term of this patent is extended or adjusted under 35 U.S.C. 154(b) by 240 days.

(21) Appl. No.: 15/065,729

(22) Filed: Mar. 9, 2016

(65) Prior Publication Data
US 2017/0228351 A1    Aug. 10, 2017

Related U.S. Application Data

(60) Provisional application No. 62/291,427, filed on Feb. 4, 2016.

(51) Int. Cl.
G06F 17/00   (2019.01)
G06F 17/22   (2006.01)
H04L 29/08   (2006.01)
G06F 17/27   (2006.01)
G06F 16/958  (2019.01)

(52) U.S. Cl.
CPC ........ *G06F 17/2247* (2013.01); *G06F 16/958* (2019.01); *G06F 17/2705* (2013.01); *H04L 67/02* (2013.01)

(58) Field of Classification Search
CPC .................................................. G06F 17/3089
USPC .............................. 715/764, 204, 229, 243
See application file for complete search history.

(56) References Cited

U.S. PATENT DOCUMENTS

| | | | | |
|---|---|---|---|---|
| 6,801,229 B1* | 10/2004 | Tinkler | ............. | G06F 17/30991 345/440 |
| 7,712,025 B2* | 5/2010 | Roessler | ........... | G06F 17/30899 711/118 |
| 9,354,922 B2* | 5/2016 | Lee | .................... | G06F 17/30722 |
| 9,925,009 B2* | 3/2018 | Baker | .................... | A61B 34/10 |
| 10,331,643 B2* | 6/2019 | Jayakumar | ........... | G06F 16/2246 |
| 2005/0102636 A1* | 5/2005 | McKeon | ................. | G06F 9/451 715/854 |
| 2005/0183075 A1* | 8/2005 | Alexander, III | ........ | G06F 8/443 717/144 |
| 2005/0268277 A1* | 12/2005 | Reeder | ...................... | G06F 8/38 717/104 |
| 2006/0002309 A1* | 1/2006 | Ban | ........................ | H04L 45/02 370/254 |
| 2006/0002313 A1* | 1/2006 | Sauermann | ............. | H04L 41/22 370/255 |
| 2006/0107206 A1* | 5/2006 | Koskimies | ............ | G06F 17/243 715/248 |
| 2008/0033996 A1* | 2/2008 | Kesari | .................... | G06F 17/212 |
| 2008/0104141 A1* | 5/2008 | McMahon | .......... | G06F 17/2288 |

(Continued)

*Primary Examiner* — Stephen S Hong
*Assistant Examiner* — Matthew J Ludwig
(74) *Attorney, Agent, or Firm* — Mintz Levin Cohn Ferris Glovsky and Popeo, P.C.

(57) ABSTRACT

Methods and apparatus, including computer program products, are provided for rendering and re-rendering a user interface of a web application based on definition of and traversal of a minimum sub-metadata tree. Related apparatus, systems, methods, and articles are also described.

20 Claims, 4 Drawing Sheets

(56) References Cited

U.S. PATENT DOCUMENTS

| | | | |
|---|---|---|---|
| 2008/0282175 A1* | 11/2008 | Costin | G06F 8/38 |
| | | | 715/760 |
| 2009/0043796 A1* | 2/2009 | Sauermann | H04L 41/22 |
| 2009/0132578 A1* | 5/2009 | Parikh | G06F 9/4443 |
| 2011/0258532 A1* | 10/2011 | Ceze | G06F 17/30902 |
| | | | 715/234 |
| 2013/0034096 A1* | 2/2013 | Hu | H04L 45/54 |
| | | | 370/389 |
| 2013/0332891 A1* | 12/2013 | Schmitlin | G06F 3/0484 |
| | | | 715/853 |
| 2014/0027829 A1* | 1/2014 | Kim | H01L 27/14612 |
| | | | 257/292 |
| 2014/0189557 A1* | 7/2014 | O'Connell, Jr. | G06F 17/3089 |
| | | | 715/767 |
| 2014/0310623 A1* | 10/2014 | O'Connell, Jr. | G06F 17/3089 |
| | | | 715/764 |
| 2016/0034508 A1* | 2/2016 | Aron | G06F 16/2246 |
| | | | 707/626 |
| 2016/0323358 A1* | 11/2016 | Malhotra | G06F 17/30233 |
| 2016/0335366 A1* | 11/2016 | Zhang | G06F 17/30887 |

* cited by examiner

METADATA DRIVEN USER INTERFACE LAYOUT CONTROL FOR WEB APPLICATIONS

TECHNICAL FIELD

The subject matter described herein relates generally to data processing and, in particular, to user interfaces.

BACKGROUND

Web applications continue to evolve to include more complicated feature sets. Static rendering of user interfaces required by such applications may not be sufficient to satisfy performance and/or user experience requirements. In some case, different customers may want different web page features. Additionally, a web page may need to be updated frequently according to different data. Currently available solutions may require significant manual effort to achieve these kinds of customizations and/or updates.

SUMMARY

In one aspect, a method includes rendering a user interface for display by a computing device, where the rendering includes traversing a metadata tree that includes nodes, and implementing an update to the user interface by changing one or more of the nodes in the metadata tree. The method further includes calculating a minimum sub metadata tree that includes the one or more changed nodes and any nodes dependent on the changed one or more nodes, and re-rendering the user interface, which includes traversing only the minimum sub metadata tree.

In some variations one or more of the following features can optionally be included in any feasible combination. The method can further include parsing raw metadata defining the user interface to create the metadata tree for use in building a web page containing the user interface dynamically guided by the metadata tree. A node (of the plurality of nodes) can include one or more collection nodes and one or more entity nodes. A collection node of the one or more collection nodes can represent at least one of a collection, a group, and a layout. An entity node of the one or more entity nodes can represent a control implemented as one or more of a label and an input field. A node of the plurality of nodes can include a configuration portion and a child portion. The configuration portion can store necessary information to render the node as a web page, and the child portion can store sub-nodes of the node. The rendering can include starting at a root node of the metadata tree and propagating to each sub-node of the metadata tree. The traversing of the metadata tree can be performed in accordance with a traversal algorithm. The method can further include differentiating between "old" metadata and "new" metadata in metadata tree after the update and calculating the minimum sub metadata tree based on the new metadata.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
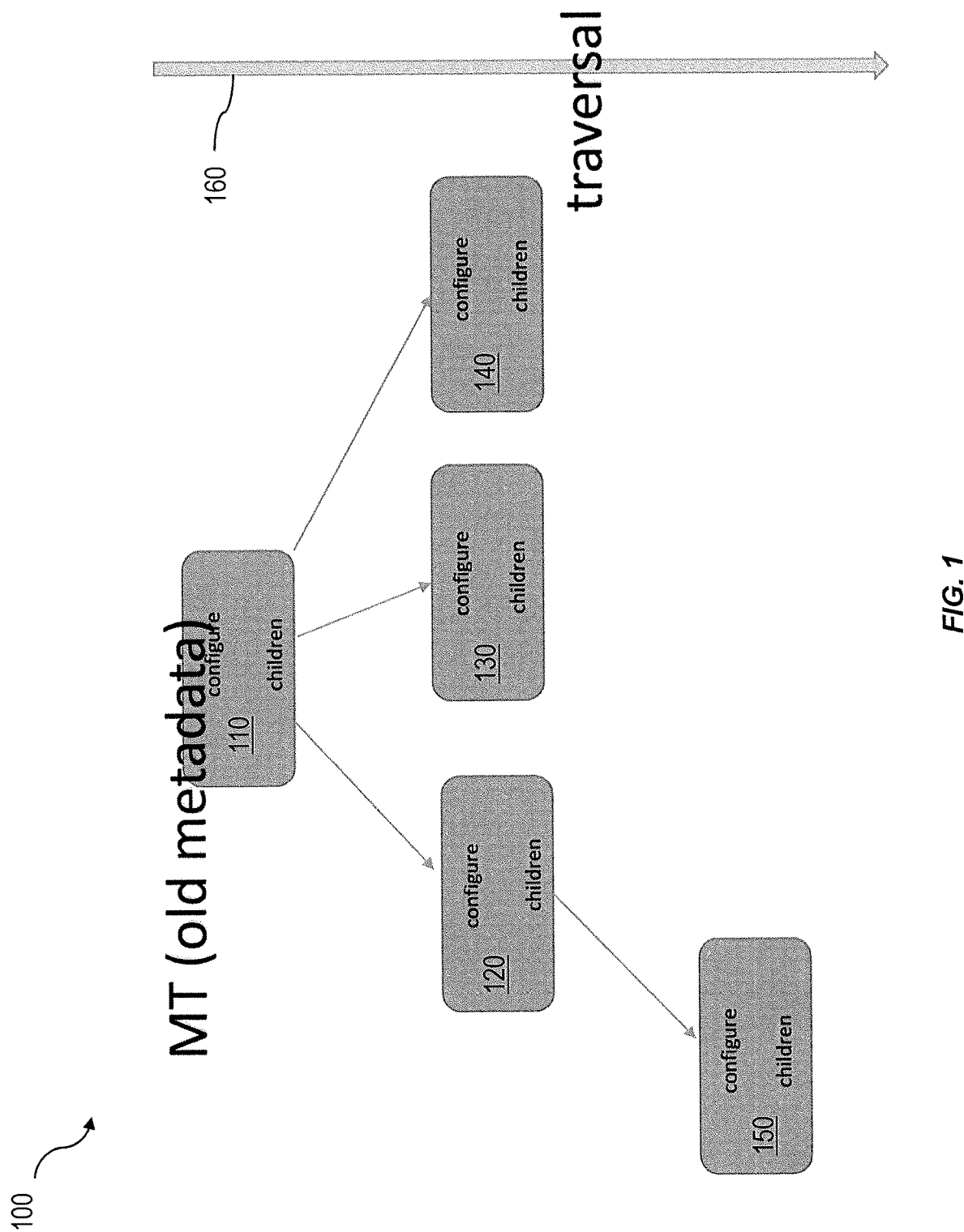
FIG. 1 shows a diagram illustrating features of a metadata tree consistent with implementations of the current subject matter.

Implementations of the current subject matter relate to an approach for rendering a page based on metadata retrieved from a backend. Instead of hard coding the webpage and its layout, a system can use raw metadata (e.g. metadata that are not pre-arranged into a hierarchical format) from the backend, and rendering need not occur until these metadata are retrieved. In some examples, a uniform framework is provided for rendering a web site based on accessing these "raw" metadata, which are arranged into a metadata tree (MT) or other hierarchical structure from which a web page can be rendered via a traversal of the MT. An update to the metadata (e.g. to the "raw" metadata from the backend) can be processed such that the framework automatically implements necessary changes to the web page. In further implementations of the current subject matter, the framework allows efficient traversal of a metadata tree to reflect an update without requiring that all nodes in the MT be traversed.

In operation, a system consistent with the current subject matter can parse the raw metadata into a metadata tree and build the web page dynamically guided by the metadata tree. The metadata tree may include a tree structure of nodes, which can include one or more collection nodes and one or more entity nodes. A collection node can optionally represent a collection, group, layout, or the like. An entity node can represent a control, which may be implemented as a label, an input field, and/or the like. A node may include one or more configuration portions and one or more child portions.

The configuration portion(s) may, for example, store any necessary information to render the node as a web page. The child portion(s) may, for example, store sub nodes of a current node.

The rendering of a webpage may start at a root node of a metadata tree and propagate to each sub node in the metadata tree. In addition to defining the metadata tree, the raw metadata may also enable traversal of the metadata tree. Thus, a system implementing features of the current subject matter may separate the web page rendering logic and the metadata tree traversal logic.

A traversal of the metadata tree may be performed in accordance with a traversal algorithm, such as for example a depth-first search, a breadth-first search, A*, and the like, so it can be applied to different types of data.

When a web page requires updating, the system may differentiate between "old" metadata and "new" metadata, and then calculate a minimum sub metadata tree (MSMT), which includes nodes having "new" metadata after an update occurs as well any sub-nodes that are dependent on the nodes having the new metadata. As used herein, old metadata refer to metadata that are not affected by the updates or changes to be applied to web page or web application, while new metadata are those that are affected. These updates or changes affect nodes in the metadata tree and can include one or more changes to a user interface element (and such changes can include deletion and/or addition of such elements). Changes can affect one or more of visual appearance, functionality, location within the user interface, context within which an element appears or how/when a certain functionality is available), etc. By identifying the MSMT prior to rendering, only the nodes appearing on the MSMT need to be re-rendered to ensure that the new metadata are fully reflected in the re-rendered web page or other web application user interface. Accordingly, at least some implementations of the current subject matter can provide advantages relative to currently available approaches by reducing the amount of re-rendering required to implement an update or other change to a web page.

FIG. 1 shows a diagram illustrating a metadata tree 100 consistent with implementations of the current subject matter. In the example of FIG. 1, the metadata tree includes only old metadata, which are included in nodes 110, 120, 130, 140, 150, each of which includes a configuration and child portion as described above. To render a web page or web application user interface based on this metadata tree, the metadata tree is traversed from parent nodes to child nodes in the direction of the traversal arrow 160.

Figure 2:
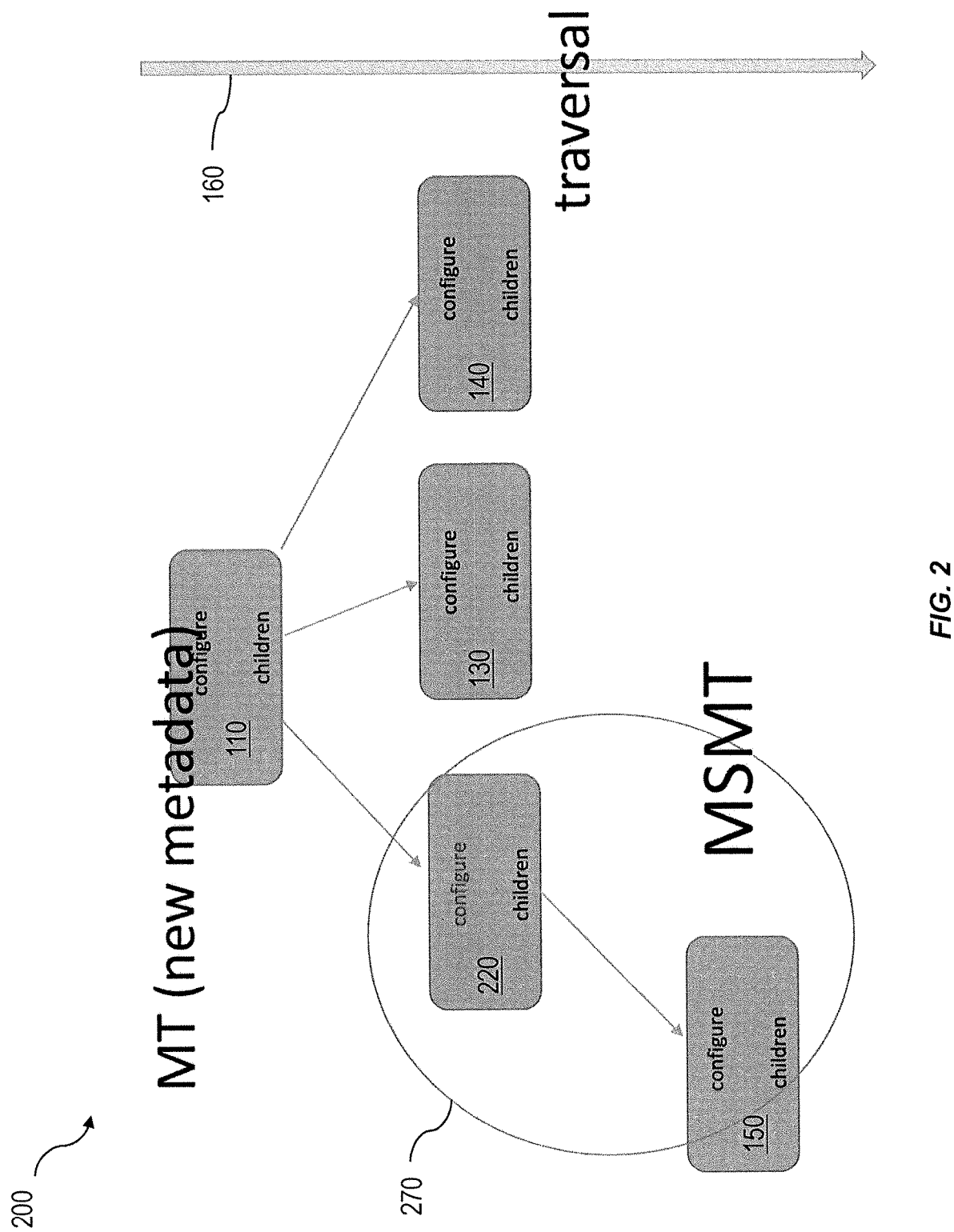
FIG. 2 shows a diagram illustrating features of a metadata tree including a minimum sub metadata tree consistent with implementations of the current subject matter.

FIG. 2 shows a diagram illustrating a second metadata tree 200. In the example of FIG. 2, the metadata tree has been updated to include new metadata in an updated node 220, which is an updated version (or optionally a complete replacement) of the old node 120 from the metadata tree 100 of FIG. 1. A minimum sub metadata tree 270 can be identified for the new metadata tree 200. In this example, the minimum sub metadata tree 270 includes the updated node 220 as well as the original node 150, which must be included in the minimum sub metadata tree 270 because of its child relationship with the updated node 220 (which as noted above is an update or replacement of the original node 120). Re-rendering of the web page or user interface of a web application based on the metadata tree 200 can proceed via re-rendering of only those nodes in the minimum sub metadata tree 270 (e.g. the updated node 220 and the original node 150 which depends as a child node from the updated node 220).

Figure 3:
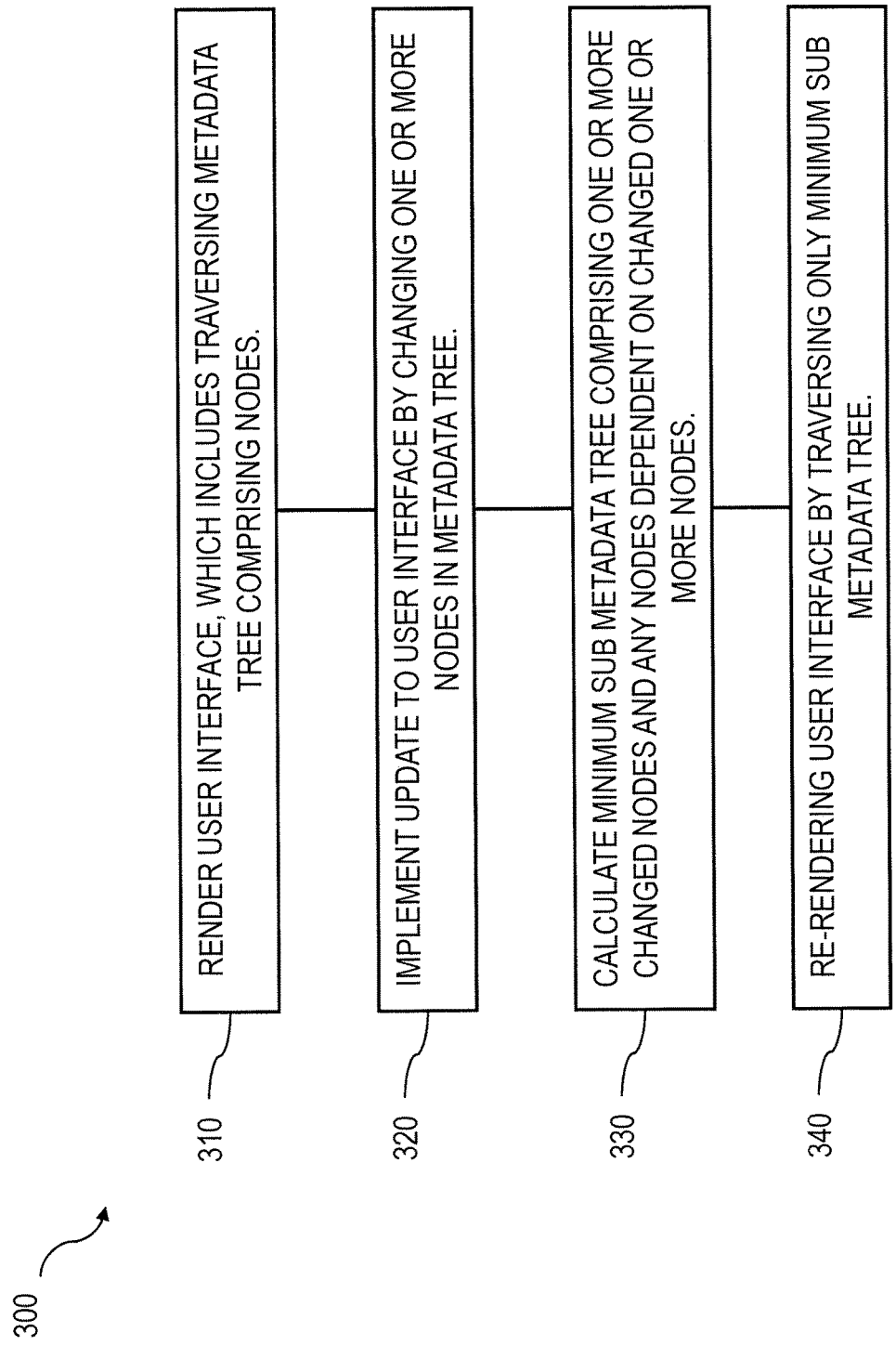
FIG. 3 shows a process flow diagram illustrating aspects of a method having one or more features consistent with implementations of the current subject matter.

FIG. 3 shows a process flow chart 300 illustrating features of a method consistent with implementations of the current subject matter. The operations described can be performed in the order in which they are presented in FIG. 3, or in some implementations in a different order. Not all of the features may be present in all implementations. At 310, a user interface is rendered, which includes traversing a metadata tree that includes nodes as defined above. At 320, an update to the user interface is implemented by changing one or more of the nodes in the metadata tree. At 330, a minimum sub metadata tree that includes the one or more changed nodes and any nodes dependent on the changed one or more nodes is calculated, and the user interface is re-rendered at 340 by traversing only the minimum sub metadata tree.

Figure 4:
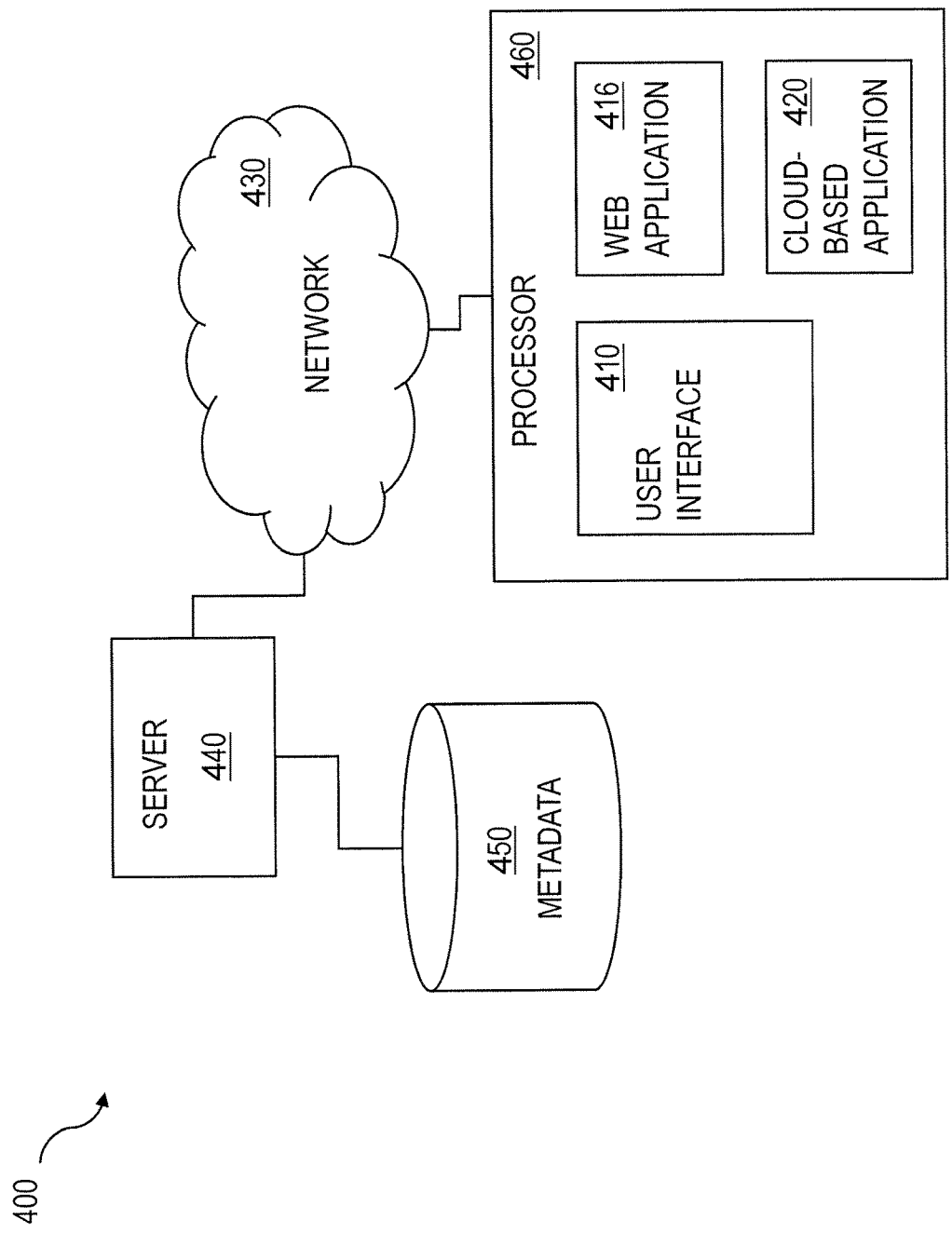
FIG. 4 shows a diagram illustrating aspects of a system showing features consistent with implementations of the current subject matter.

FIG. 4 shows a diagram of a system 400 for rendering a user interface of a web application (e.g. a web page), consistent with some example implementations of the current subject matter. The system 400 may include a user interface 410, such as a browser or other type of user interface that can be generated and presented at a display via operation of a web application. For example, a user interface may be a web page, client application, browser, and/or the like associate with a web application 416 or a corresponding cloud-based application 420 accessible via a network 430 at a server 440. The functionality of the user interface 410 can be defined by metadata 450, which can be stored at or accessible by the server 440. As noted above, changes to the functionality (defined above) of the web page can occur via updates to one or more nodes in a metadata tree 100 into which the metadata are organized.

In the example of FIG. 4, the system 400 may include a processor 460, such as a computer, a tablet, a smartphone, and/or the like, as well as other components, such as a display and the like. The processor 460 may comprise at least one processor and at least one memory including program code, and the processor 460 may include a web application 416 downloaded via a wireless or wired channel from the server 440 via the network 430. The web application 416 may be the processor-side portion of a cloud-based service or application 420 hosted at the server 440. For example, launching the web application 416 may trigger generation of the user interface 410, where information can be presented and displayed to enable interaction between the application 416 (and/or its user at the user interface 410) and the server 440 including the application 420.

One or more processors at the server 440 can perform the operations described above in causing re-rendering of the user interface 410 based on traversal of the minimum sub metadata tree 170. Alternatively, the re-rendering can occur at the one or more processors 460 where the web application 416 is executed on a local machine.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
    rendering a user interface for display by a computing device, the rendering comprising traversing a metadata tree comprising a first node, a second node, and a third node, each of the first node, the second node, and the third node comprising metadata defining a functionality of the user interface; and
    in response to an update to a layout of the user interface:
        modifying the first node based at least on the first node being affected by the update to the user interface;
        calculating a minimum sub metadata tree by at least traversing the metadata tree to identify the first node and the second node but not the third node for inclusion in the minimum sub metadata tree, the first node being identified for inclusion in the minimum sub metadata tree based at least on the first node being affected by the update to the user interface, the second node being identified for inclusion in the minimum sub metadata tree based at least on the second node also being affected by the update to the user interface by being a child node of the first node, and the third node being excluded from the minimum sub metadata tree based at least on the third node not being affected by the update to the user interface by not being a child node of the first node; and
        re-rendering the user interface for display by the computing device, the re-rendering of the user interface comprising traversing the minimum sub metadata tree instead of the metadata tree, the minimum sub metadata tree being traversed to re-render the first node and the second node, and the re-rendering of the user interface excludes a re-rendering of the third node absent from the minimum sub metadata tree.

2. A computer-implemented method as in claim 1, further comprising:
parsing raw metadata defining the user interface to create the metadata comprising the first node, the second node, and the third node in the metadata tree for use in building a web page containing the user interface, the building of the web page being dynamically guided by the metadata tree.

3. A computer-implemented method as in claim 1, wherein the first node and/or the second node comprise a collection node and/or an entity node.

4. A computer-implemented method as in claim 3, wherein the collection node corresponds to a collection, a group, and/or at least a portion of the layout of the user interface.

5. A computer-implemented method as in claim 3, wherein the entity node corresponds to a control implemented as a label and/or an input field.

6. A computer-implemented method as in claim 1, wherein the first node and/or the second node comprise a configuration portion and/or a child portion.

7. A computer-implemented method as in claim 6, wherein the configuration portion stores necessary information to render the first node and/or the second node as a web page, and wherein the child portion stores one or more sub-nodes of the first node and/or the second node.

8. A computer-implemented method as in claim 7, wherein the rendering of the user interface comprises traversing the metadata tree from a root node of the metadata tree and propagating to at least the minimum sub metadata tree.

9. A computer-implemented method as in claim 1, wherein the traversing of the metadata tree is performed in accordance with a traversal algorithm.

10. A computer-implemented method as in claim 1, wherein the calculating of the minimum sub metadata tree comprises differentiating between a first metadata affected by the update to the user interface and a second metadata unaffected by the update to the user interface.

11. A computer program product comprising a non-transitory machine-readable medium storing instructions that, when executed by at least one programmable processor, cause the at least one programmable processor to perform operations comprising:
rendering a user interface for display by a computing device, the rendering comprising traversing a metadata tree comprising a first node, a second node, and a third node, each of the first node, the second node, and the third node comprising metadata defining a functionality of the user interface; and
in response to an update to a layout of the user interface:
modifying the first node based at least on the first node being affected by the update to the user interface;
calculating a minimum sub metadata tree by at least traversing the metadata tree to identify the first node and the second node but not the third node for inclusion in the minimum sub metadata tree, the first node being identified for inclusion in the minimum sub metadata tree based at least on the first node being affected by the update to the user interface, the second node being identified for inclusion in the minimum sub metadata tree based at least on the second node also being affected by the update to the user interface by being a child node of the first node, and the third node being excluded from the minimum sub metadata tree based at least on the third node not being affected by the update to the user interface by not being a child node of the first node; and
re-rendering the user interface for display by the computing device, the re-rendering of the user interface comprising traversing the minimum sub metadata tree instead of the metadata tree, the minimum sub metadata tree being traversed to re-render the first node and the second node, and the re-rendering of the user interface excludes a re-rendering of the third node absent from the minimum sub metadata tree.

12. A computer program product as in claim 11, further comprising:
parsing raw metadata defining the user interface to create the metadata comprising the first node, the second node, and the third node in the metadata tree for use in building a web page containing the user interface, the building of the web page being dynamically guided by the metadata tree.

13. A computer program product as in claim 11, wherein the first node and/or the second node comprise a collection node and/or an entity node.

14. A computer program product as in claim 13, wherein the collection node corresponds to a collection, a group, and/or at least a portion of the layout of the user interface, and wherein the entity node corresponds to a control implemented as a label and/or an input field.

15. A computer program product as in claim 11, wherein the first node and/or the second node comprise a configuration portion and/or a child portion.

16. A computer program product as in claim 15, wherein the configuration portion stores necessary information to render the first node and/or the second node as a web page, and wherein the child portion stores one or more sub-nodes of the first node and/or the second node.

17. A computer program product as in claim 16, wherein the rendering of the user interface comprises traversing the metadata tree from a root node of the metadata tree and propagating to at least the minimum sub metadata tree.

18. A computer program product as in claim 11, wherein the traversing of the metadata tree is performed in accordance with a traversal algorithm.

19. A computer program product as in claim 11, wherein the calculating of the minimum sub metadata tree comprises differentiating between a first metadata affected by the update to the user interface and a second metadata unaffected by the update to the user interface.

20. A system, comprising
at least one data processor; and
at least one memory storing instructions, which when executed by the at least one data processor, result in operations comprising:
rendering a user interface for display by a computing device, the rendering comprising traversing a metadata tree comprising a first node, a second node, and a third node, each of the first node, the second node, and the third node comprising metadata defining a functionality of the user interface; and
in response to an update to a layout of the user interface:
modifying the first node based at least on the first node being affected by the update to the user interface;
calculating a minimum sub metadata tree by at least traversing the metadata tree to identify the first node and the second node but not the third node for inclusion in the minimum sub metadata tree, the first node being identified for inclusion in the minimum sub metadata tree based at least on the first node being affected by the update to the user interface, the second node being identified for inclusion in the minimum sub metadata tree based at least on the second node also being affected by the update to the user interface by being a child node of the first node, and the third node being excluded from the minimum sub metadata tree based at least on the third node not being affected by the update to the user interface by not being a child node of the first node; and re-rendering the user interface for display by the computing device, the re-rendering of the user interface comprising traversing the minimum sub metadata tree instead of the metadata tree, the minimum sub metadata tree being traversed to re-render the first node and the second node, and the re-rendering of the user interface excludes a re-rendering of the third node absent from the minimum sub metadata tree.

* * * * *